United States Patent Office

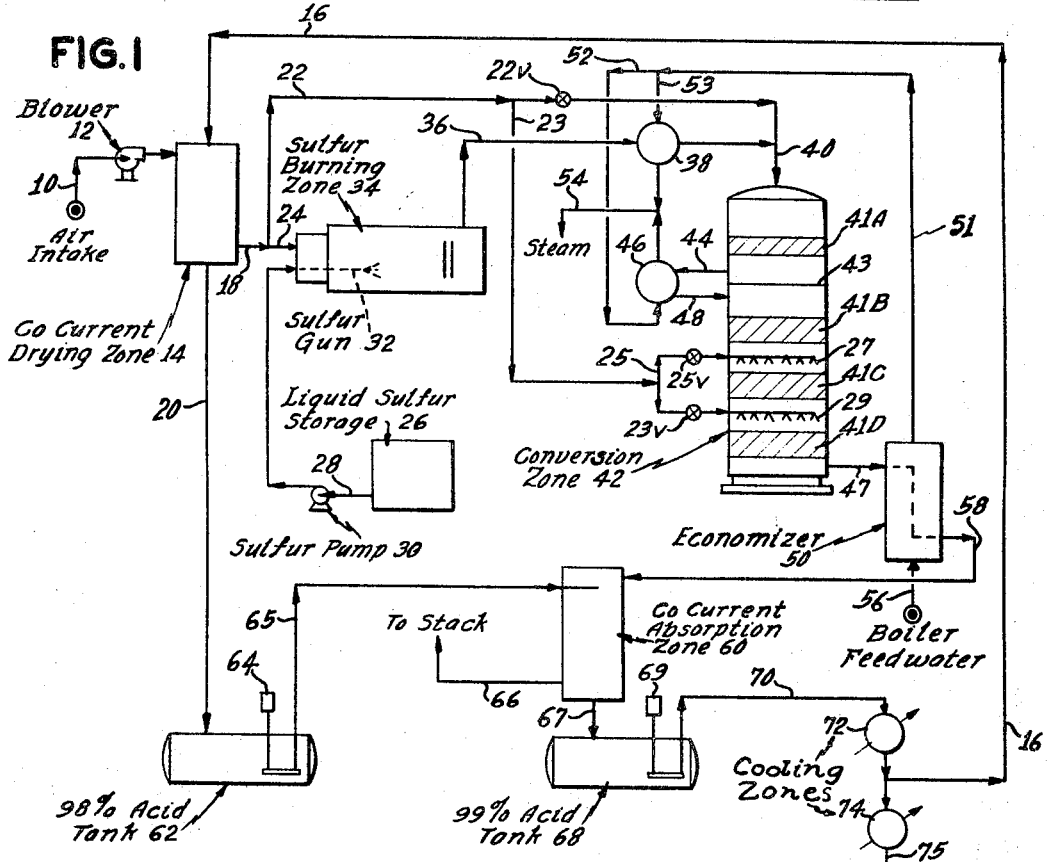

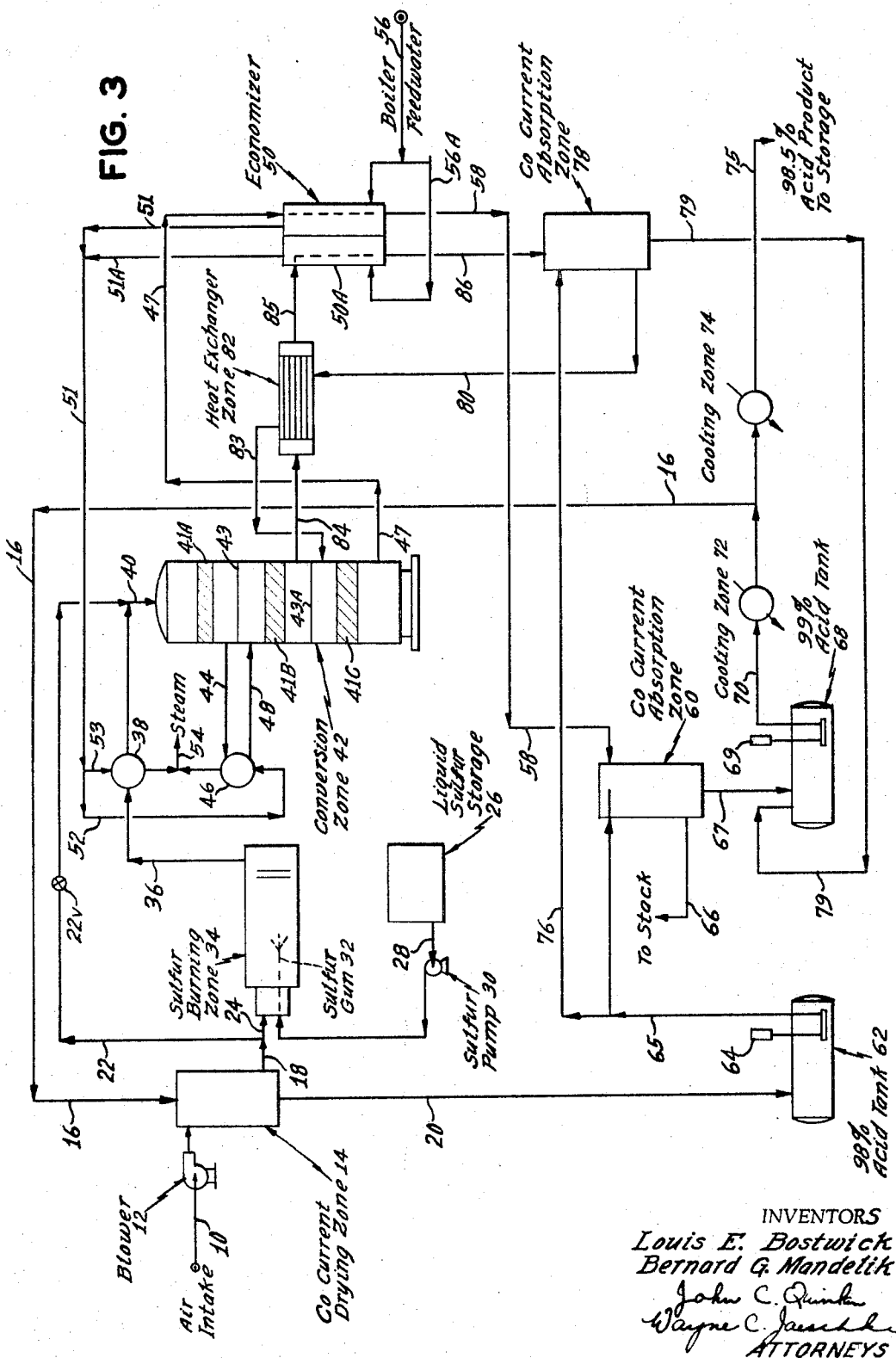

3,432,264
Patented Mar. 11, 1969

3,432,264
SULFURIC ACID PROCESS
Louis E. Bostwick, Forest Hills, and Bernard G. Mandelik,
Armonk, N.Y., assignors to Pullman Incorporated,
Chicago, Ill., a corporation of Delaware
Filed July 30, 1965, Ser. No. 476,001
U.S. Cl. 23—168                                8 Claims
Int. Cl. C01b 17/76, 17/74, 17/72

ABSTRACT OF THE DISCLOSURE

The present invention concerns an improved process for the manufacture of sulfuric acid wherein dynamic gas-liquid contacting means, for example, venturi tube gas-liquid contactors, are used in place of conventional packed towers to contact moist process air with concentrated sulfuric acid to dry the air and are preferably also used in place of conventional packed towers to contact sulfur trioxide with sulfuric acid to form additional sulfuric acid.

---

The present invention relates to a process for producing sulfuric acid and more particularly to an improved method for drying the air supplied to the process, to an improved method for the absorption of sulfur trioxide produced in the process, and to a novel and efficient process employing such improvements.

In the known sulfuric acid processes, atmospheric air required for the oxidization of sulfur to produce sulfur trioxide is dried by passing the air countercurrent to a stream of concentrated sulfuric acid in a drying zone which is conventionally a column filled with a suitable inert column packing. The packing attenuates the flow of the air and acid streams to effect intimate contact between moisture-laden air and the acid. The air is dried by absorption of the moisture in the acid. The acid is recirculated to the drying zone following heat exchange against cooling water to remove heat imparted to the acid during the drying step. The conventional method of air drying, therefore, requires a contacting tower, and a cooling circuit which comprises suitable heat exchange means for water cooling of the recirculated acid. The dried air is employed in the conversion of sulfur to sulfur dioxide and then to sulfur trioxide. A gaseous stream containing sulfur trioxide withdrawn from the conversion zone is passed in countercurrent flow to a stream of concentrated sulfuric acid, in the conventional process, in order to effect absorption of the sulfur trioxide in the acid. This absorption conventionally takes place in a packed tower similar to the tower mentioned above in connection with drying of the atmospheric air. Such packed towers are, unfortunately, relatively large and expensive to install and maintain; and the known processes in which countercurrent absorption is practiced fail to take maximum advantage of the energy of the several streams entering and leaving such towers. It is therefore an object of the present invention to overcome and eliminate the disadvantages inherent in the prior art processes.

Another object of the present invention is to provide a novel and efficient method for drying atmospheric air feed to a sulfuric acid process.

Another object of the present invention is to provide an improved method for absorbing sulfur trioxide in concentrated sulfuric acid to produce additional concentrated sulfuric acid product.

Another object is to provide a novel and efficient process employing a cocurrent-flow air drying zone and a cocurrent-flow sulfur trioxide absorption zone.

Still another object of the present invention is to provide an improved process for the conversion of sulfur dioxide to sulfur trioxide and improved recovery of the sulfur trioxide thereby reducing the quantity of unconverted sulfur dioxide vented to the atmosphere in the waste gas stream.

Other objects and advantages of the present invention will become apparent to those skilled in the art from the following description and disclosure.

These and other objects are generally accomplished in accordance with the present invention by drying the atmospheric air feed to the process in a dynamic gas contacting zone which comprises a first confined mixing zone of relatively large cross sectional area and a second zone of relatively cross sectional area and a second zone of relatively small cross sectional area in which turbulent flow conditions are produced. Accordingly, moist atmospheric air and concentrated sulfuric acid are contacted in the first confined zone of relatively large cross sectional area to provide a mixed stream of moist air having sulfuric acid dispersed therein. The mixed stream is flowed through the second confined zone of relatively small cross sectional area under conditions of turbulent flow thereby causing moisture in the air to be absorbed in the acid. The air and acid mixture is passed to a suitable separation zone wherein dried air is separated from the acid containing absorbed water, the temperature of the separated streams being essentially equal. A portion of the dried air is used in the oxidization of sulfur to sulfur dioxide and another portion is used in the catalytic oxidization of sulfur dioxide to produce a gaseous stream containing sulfur trioxide. The acid stream withdrawn from the separation zone is passed essentially adiabatically, except for the heat lost in passage, to an absorption zone where it is contacted with the gaseous stream containing sulfur trioxide under conditions suitable to absorb the sulfur trioxide in the sulfuric acid thereby producing additional concentrated sulfuric acid. The acid in the separation zone is preferably separated and passed to the sulfur trioxide absorption zone at a temperature of between about 175° F. and about 185° F., this being the preferred temperature range for the acid feed to the sulfur trioxide absorption zone. The additional concentrated acid produced in the sulfur trioxide absorption zone is preferably admixed with process water to obtain the desired acid concentration. The acid is then cooled and a portion thereof passed to the air drying zone and the remainder withdrawn as product.

The phrase "turbulent flow" as used in this specification and the claims is defined in accordance with the conventional usage in terms of the Reynolds number which, for a gas of constant density and viscosity, is a factor of the average linear gas velocity and conduit diameter. For a compressible fluid such as air, the conditions of conduit diameter and average linear gas velocity which are required in order to produce a Reynolds number of about 2,300 or greater are defined as turbulent flow. In the dynamic contacting operations described in accordance with the present invention, Reynolds numbers of between about 1,000,000 and about 2,000,000 are preferred.

Preferably, the absorption of sulfur trioxide in the acid withdrawn from the separation zone is carried out in a dynamic gas contacting zone such as is hereinabove described. The concentrated sulfuric acid withdrawn from the separation zone and a gaseous stream containing sulfur trioxide are contacted in the first confined zone of relatively large cross sectional area to provide a mixed stream of gaseous material having sulfuric acid dispersed therein. The mixed stream is flowed through the second confined zone of relatively small cross sectional area under conditions of turbulent flow thereby causing absorption of sulfur trioxide in the acid.

Most preferably, the dynamic gas contacting zone employed in the present invention is constructed in the form of a Venturi tube having a converging zone, i.e., a confined zone of diminishing cross sectional area leading from the confined zone of relatively large cross sectional area into the zone of relatively small cross sectional area, i.e., the throat; and a diverging zone, i.e., a confined zone of expanding cross sectional area leading away from the throat into the separation zone. One alternative embodiment of the dynamic gas contacinig zone comprises a conduit of constant, relatively large cross sectional area having, for example, at a downstream location a plate having an orifice therein, the plate being situated in the conduit perpendicular to the direction of flow so as to form a seal such that the gaseous material in the conduit must flow through the orifice. The orifice has a relatively small diameter such that turbulent flow conditions can be maintained therein, employing desired gas velocities in the conduit.

Another object of the present invention is accomplished by passing moist air in cocurrent contact with concentrated sulfuric acid in a drying zone thereby drying the air by transfer of its moisture content to the acid. The dried air is separated from the acid and the acid is passed essentially adiabatically to first and second sulfur trioxide absorption zones. A portion of the dried air is employed to oxidize sulfur to sulfur dioxide. Another portion of the dried air is contacted with the sulfur dioxide and the resulting mixture is passed through a first catalytic conversion zone which is maintained under conditions to convert a portion of the sulfur dioxide to sulfur trioxide. A gaseous stream containing sulfur trioxide and unconverted sulfur dioxide is withdrawn from the first conversion zone, cooled and passed to the first absorption zone where sulfur trioxide is absorbed in the acid separated from the drying zone and passed to the first absorption zone. Absorption of the sulfur trioxide in the acid produces additional concentrated sulfuric acid and a remaining gaseous stream containing sulfur dioxide, which is catalytically converted in a second conversion zone to produce a second gaseous stream containing sulfur trioxide. The second gaseous stream is passed into the second absorption zone which is maintained under conditions suitable to absorb the sulfur trioxide in the portion of the acid separated from the drying zone and passed to the second absorption zone. Absorption in the acid of sulfur trioxide from the second gaseous stream produces additional concentrated acid and a waste gaseous stream essentially free of sulfur oxides. The concentrated acid produced in the first and second absorpion zones is cooled and withdrawn as product.

It is preferred in the process described above that the gaseous stream containing sulfur dioxide and sulfur trioxide withdrawn from the first conversion zone is cooled by indirect heat exchange with the remaining gaseous stream withdrawn from the first absorption zone. The heated remaining gaseous stream is then introduced into the second conversion zone. It is also preferred in the above described process that after cooling the sulfuric acid product of the first and second absorption zones, a portion of the cooled product be passed to the air drying zone and the remaining cooled acid be withdrawn as product.

One important advantage of the present invention is that a lower investment cost per ton capacity is possible since the contacting towers used in the known sulfuric acid processes both for air drying and sulfur trioxide absorption can be replaced by relatively inexpensive dynamic contacting means, moreover, the heat exchange and cooling water requirements of the conventional acid cooling circuit employed in conjunction with conventional air drying methods are not needed.

Another advantage of the present invention is that a greater portion of the heat of solution of water in sulfuric acid is made available to steam production and a lesser portion is required to be removed employing cooling water. This advantage is realized by reason of the method of contacting employed which utilizes cocurrent flow instead of countercurrent flow in the air drying zone. It is apparent that the present invention eliminates the need for a separate acid cooling circuit employed in conjunction with the air drying zone in the known processes, and enhances the overall steam output of the process.

Still another important advantage of the present invention is the capability to substantially completely remove sulfur dioxide from the gaseous material vented to the atmosphere. This is important since sulfur dioxide is a noxious air pollutant.

Having thus described the invention in general terms, reference is now made to the accompanying drawings for a better understanding of the present invention.

FIGURE 1 illustrates, in diagrammatic form, a preferred embodiment of the process of the present invention.

FIGURE 2 illustrates in diagrammatic form a preferred means for carrying out cocurrent drying and absorption operations in the process of the present invention.

FIGURE 3 illustrates in diagrammatic form a preferred modification of the process described in FIGURE 1.

Referring now to FIGURE 1, line 10 is an air intake from the atmosphere to blower 12 which forces atmospheric air into a drying zone 14 where said air is flowed cocurrently with a stream of about 98.5% sulfuric acid which dries the air by absorbing the moisture therein. The absorption by the concentrated sulfuric acid causes an increase in temperature of both the acid and air streams by reason of the heat of solution released. Dried air leaves the drying zone 14 via line 18, part of the air being diverted via line 22 through valve 22V into conversion zone 42. The drying acid is withdrawn from drying zone 14 in line 20 at a temperature suitable for essentially adiabatic passage to absorption zone 60 via holding tank 62 and pump 64 in line 65.

Dried air enters the sulfur burning zone 34 via line 24 where it is employed in the oxidazation of sulfur to sulfur dioxide. Liquid sulfur is withdrawn from storage 26 via line 28 by means of pump 30 and is fed into the sulfur burning zone by sulfur gun 32.

Gaseous combustion products at an elevated temperature are passed through line 36 to waste heat drum 38 where they are cooled by indirect heat exchange against boiler feed water introduced through line 53 from line 51. The cooled gaseous stream containing sulfur dioxide in line 36 is commingled in line 40 with dried air introduced via line 22. This mixture is fed into conversion zone 42 which is a conventional four stage convertor containing serially arranged stationary porous beds of vanadium pentoxide oxidization catalyst 41A, 41B, 41C and 41D. The conversion zone is maintained under suitable conditions for the conversion of sulfur dioxide to sulfur trioxide. As the gaseous mixture of air and sulfur dioxide is passed through catalyst bed 41A, sulfur dioxide and oxygen react exothermically to produce a gaseous mixture containing sulfur trioxide at a temperature which is substantially higher than the inlet temperature. In order to reduce the temperature of the gaseous mixture thus obtained to a level which favors further conversion of sulfur dioxide, the heated products are diverted by means of partition 43 through line 44 and circulated through waste heat boiler 46 where they are cooled by indirect heat exchange against boiler feed water. The feed water is introduced in line 52 and is withdrawn as steam, together with the material in line 53, through line 54. The cooled gaseous stream is reintroduced via line 48 into the conversion zone where it is passed serially through catalyst beds 41B, 41C and 41D to effect further conversion of sulfur dioxide to sulfur trioxide. Further interstage cooling is effected by diluting the gaseous stream emerging from 41B and 41C with dried air introduced via line 25 through nozzles 27 between 41B and 41C, and introduced via line 23 through nozzles 29 between 41C and 41D. Valves 25V and 23V control the flow of diluent air in lines 25 and 23, respectively. Conversion of sulfur dioxide to sulfur trioxide of about 98% is realized in the conventional conversion zone 42 described herein.

Gaseous material containing sulfur trioxide is withdrawn through line 47 and passed in indirect heat exchange in economizer 50 against boiler feed water which is introduced in line 56 and withdrawn in line 51. The cooled gaseous material is introduced via line 58 into absorption zone 60, which is preferably a dynamic cocurrent contactor, where it is contacted with the concentrated sulfuric acid obtained from cocurrent drying zone 14. Sulfur trioxide in gaseous stream 58 is absorbed by the concentrated acid thus producing additional concentrated sulfuric acid. Waste gas is vented from absorption zone 60 to a stack via line 66. Concentrated acid product is withdrawn from absorption zone 60 through line 67 to 99% acid tank 68. Process water is introduced as needed to tank 68 in order to achieve the desired acid concentration. Acid is removed by pump 69 through line 70 and reduced in temperature in cooling zone 72 to a suitable level for introduction into air drying zone 14. A portion of the cooled acid is removed via line 16 for passage to the drying zone. The remaining acid is further reduced in temperature in cooling zone 74 and passed via line 75 to product storage.

The manner of contacting the liquid and gaseous streams in the drying and absorption zones constitutes an important aspect of the process of the present invention. It is essential to the operation of the process of the present invention that the air introduced via line 10 and the concentrated acid introduced via line 16 are cocurrently contacted at the inlet side of drying zone 14 to form a mixed stream which is flowed to the outlet side of the drying zone. The acid withdrawn from the outlet side of the drying zone is at a preferred temperature for introduction to the sulfur trioxide absorption zone which is preferably between about 175° F. and about 185° F. and is suitable for essentially adiabatic passage to such absorption zone.

It is preferred but not essential to operation of the process of this invention that the sulfur trioxide be absorbed in concentrated sulfuric acid employing cocurrent flow in absorption zone 60, and most preferably in a dynamic gas contacting zone such as hereinafter described with reference to FIGURE 2.

Referring now to FIGURE 2, which illustrates a dynamic gas contacting zone having weir 104 situated in a zone of relatively large cross sectional area upstream of a zone of relatively small cross sectional area 110, i.e., the throat. Converging zone 108 connects the upstream zone and the throat and diverging zone 112 leads from throat 110 into a separation zone 114. The gaseous stream to be dried or stripped is introduced in line 100 and the drying or stripping liquid is introduced through lines 102 for flow over weir 104. As the liquid flows over the weir it is picked up and dispersed in the gaseous material. Such material passes through converging zone 108 into throat section 110 at a velocity such that turbulent flow conditions are maintained in the throat. The intimate contact achieved under conditions of turbulent flow causes moisture in the air and sulfur trioxide in a gaseous mixture to be absorbed in concentrated sulfuric acid dispersed therein. The material withdrawn from the throat passes through diverging zone 112 to gas-liquid separation zone 114. The contacted liquid collects at the bottom of separation body 114 and is withdrawn through line 118. The contacted gas is vented through line 116.

Having thus described the operation of FIGURES 1 and 2 in general terms, reference is now made to specific examples of operation which are set forth in Tables I and II below.

Table I illustrates the use of a dynamic gas contacting zone, such as is hereinabove described in reference to FIGURE 2, in the process of FIGURE 1.

TABLE I
(A)

| Reference Fig. 1 | Reference Fig. 2 | Temp., °F. | Flow Rate lbs. per hr. | Percent Acid conc. |
|---|---|---|---|---|
| 10 | 100 | 140 | 85,900 | ------ |
| 16 | 102 | 170 | 940,600 | 98.7 |
| 18 | 116 | 180 | 83,900 | ------ |
| 20 | 118 | 180 | 942,600 | 98.5 |

(B)

| Reference Fig. 2 | Max. Cross Sect. Area, sq. ft. | Superficial Gas Velocity, ft. per sec. |
|---|---|---|
| 108 | 6.0 | 50 |
| 110 | 1.15 | 250 |
| 112 | 3.6 | 80 |

Table II illustrates the use of a dynamic gas contacting zone of FIGURE 2 for the cocurrent absorption of sulfur trioxide in sulfuric acid such as is described with reference to absorption zone 60 in FIGURE 1.

TABLE II

| Reference Fig. 1 | Reference Fig. 2 | Temp., °F. | Flow Rate, lbs. per hr. | Percent Acid conc. | Mol percent $SO_3$ | Mol percent $SO_2$ |
|---|---|---|---|---|---|---|
| 58 | 100 | 450 | 92,400 | ------ | 9.18 | .288 |
| 65 | 102 | 180 | 942,600 | 98.5 | ------ | ------ |
| 66 | 116 | 235 | 72,000 | ------ | ------ | .317 |
| 67 | 118 | 235 | 963,000 | 99.0 | ------ | ------ |

The gas velocities in and the cross sectional areas of the apparatus employed in absorption zone 60 are essentially the same as those given for the air drying apparatus in part B of Table I.

Referring to FIGURE 3, which illustrates a modification of the process described with reference to FIGURE 1. In this modification conversion zone 42 is modified by deletion of one catalyst bed and insertion of partition 43A which diverts the flow of gaseous material emerging from catalyst bed 41B through line 84. The diverted gaseous material in line 84 is passed in indirect heat exchange against the gaseous material recirculated from absorption zone 78 in heat exchanger zone 82. The cooled gases are withdrawn from heat exchanger zone 82 via line 85 and introduced into economizer 50A where they are passed in indirect heat exchange against boiler feed water introduced via line 56A. The thus further cooled gaseous stream is introduced via line 86 into first absorption zone 78 where it is passed cocurrently with a concentrated acid stream introduced via line 76 as, for example, in the dynamic gas-liquid contacting zone described with reference to FIGURE 2. The sulfur trioxide in line 86 is absorbed by concentrated sulfuric acid introduced via line 76 thereby producing additional concentrated sulfuric acid. The concentrated sulfuric acid is withdrawn from first absorption zone 78 via line 79 to 99% acid tank 68. The gaseous stream, essentially depleted of sulfur trioxide but containing unconverted sulfur dioxide is withdrawn via line 80 and passed in indirect heat exchange through heat exchanger zone 82 as previously described, the heated gas being introduced via line 83 into the conversion zone 42 above catalyst bed 41C. After passing through catalyst bed 41C, where remaining sulfur dioxide is converted to sulfur trioxide, the gaseous stream is withdrawn through line 47 and introduced into economizer 50 where it is passed in indirect heat exchange against boiler feed water introduced via line 56. The cooled gaseous stream is withdrawn via line 58 and introduced into second cocurrent absorption zone 60 where it is contacted in cocurrent flow with concentrated acid introduced via line 65 in the same manner as in first cocurrent absorption zone 78. The concentrated acid product of second absorption zone 60 is withdrawn via line 67 and introduced into 99% acid tank 68. The waste gas, which is essentially free of sulfur dioxide, is passed from second absorption zone 60 via line 66 to the stack. The acid product is withdrawn from 99% acid tank 68 by pump 69 via line 70 and a portion of it is recycled to cocurrent drying zone 14 in a manner identical to that described in connection with the process of FIGURE 1.

Table III illustrates an example of the operation of the process described in FIGURE 3.

TABLE III

| Reference Fig. 3 | Reference Fig. 2 | Temp., °F. | Flow Rate, lbs. per hr. | Percent Acid conc. | Mol Percent $SO_3$ | Mol Percent $SO_2$ |
|---|---|---|---|---|---|---|
| Conversion zone 42 and absorption zone 78: | | | | | | |
| 84 | | 820 | 87,600 | | 8.7 | 1.0 |
| 85 | | 545 | 87,600 | | 8.7 | 1.0 |
| 86 | | 445 | 87,600 | | 8.7 | 1.0 |
| 80 | | 230 | 69,200 | | | 1.15 |
| 83 | | 820 | 69,200 | | | 1.15 |
| 47 | | 825 | 69,200 | | 1.05 | .10 |
| 76 | | 180 | 848,300 | 98.5 | | |
| 79 | | 230 | 866,700 | 98.7 | | |
| Absorption zone 60: | | | | | | |
| 58 | | 445 | 69,200 | | 1.05 | .10 |
| 67 | | 230 | 96,300 | 98.7 | | |
| 66 | | 230 | 67,200 | | | .11 |
| 65 | | 180 | 94,300 | 98.5 | | |

The gas velocities in and the cross sectional areas of the apparatuses employed in absorption zones 60 and 78 are essentially the same as those given for the air drying apparatus in part B of Table 1.

Having thus described the invention by reference to specific examples and preferred embodiments of method and means for carrying out said invention, it will be obvious to those skilled in the art that many modifications and alterations can be made to the described methods and processes without departing from the scope and spirit of the present invention. The present invention should not be limited by the methods and descriptions given by way of illustration, but should be limited only by the claims.

What is claimed is:

1. A process for producing sulfuric acid which comprises contacting in a first confined zone of relatively large cross sectional area a stream of concentrated sulfuric acid obtained as hereinafter defined and a stream of moist air to provide a mixed stream of moist air having sulfuric acid dispersed therein, flowing said mixed stream through a second confined zone of relatively small cross sectional area under conditions of turbulent flow, thereby causing moisture in the air to be absorbed in the concentrated sulfuric acid, separating the thusly dried air stream from an acid stream of essentially equal temperature and employing the dried air in the oxidization of sulfur to sulfur dioxide and thence to obtain a sulfur trioxide containing gaseous stream, passing the said acid stream essentially adiabatically to an absorption zone where sulfur trioxide in said gaseous stream is absorbed in said acid stream to produce additional concentrated sulfuric acid, cooling said concentrated sulfuric acid so produced and passing a portion thereof to said first confined zone, and withdrawing the remaining portion as product.

2. The method of claim 1 in which said mixed stream containing moist air and having sulfuric acid dispersed therein is flowed through a converging zone into said confined zone of relatively small cross sectional area and then through a diverging zone into a separation zone.

3. The process of claim 1 in which the absorption of sulfur trioxide in said acid stream is carried out by contacting said sulfur trioxide containing gaseous stream and said acid stream separated from said dried air in a first confined zone of relatively large cross sectional area to provide a mixed stream containing sulfur trioxide and having sulfuric acid dispersed therein, flowing said mixed stream through a second confined zone of relatively a small cross sectional area under conditions of turbulent flow thereby absorbing sulfur trioxide in the sulfuric acid to produce additional concentrated sulfuric acid.

4. The method of claim 3 in which said mixed stream containing sulfur trioxide and having sulfuric acid dispersed therein is flowed through a converging zone into said confined zone of relatively small cross sectional area and then through a diverging zone into a separation zone.

5. The process of claim 1 in which said acid stream of essentially equal temperature separated from said dry air stream and essentially adiabatically passed to the absorption zone is at a temperature of between about 175° F. and about 185° F.

6. A process for producing sulfuric acid which comprises passing moist air in cocurrent contact with concentrated sulfuric acid in a drying zone thereby transferring moisture from the air to said acid, separating thus dried air from said acid and passing said acid essentially adiabatically to first and second sulfur trioxide absorption zones, employing a portion of thus dried air to oxidize sulfur to sulfur dioxide, contacting another portion of thus dried air with the sulfur dioxide and passing the mixture through a first catalytic conversion zone maintained under conditions to convert a portion of the sulfur dioxide to sulfur trioxide, withdrawing a gaseous stream containing sulfur dioxide and sulfur trioxide from the first conversion zone, cooling and passing said stream to said first absorption zone to absorb sulfur trioxide in said acid separated from said drying zone to produce additional concentrated sulfuric acid and a remaining gaseous stream containing sulfur dioxide, catalytically converting the sulfur dioxide in the remaining gaseous stream in a second conversion zone to produce a second gaseous stream containing sulfur trioxide, passing the second gaseous stream into the second absorption zone maintained under conditions suitable to absorb the sulfur trioxide in the remaining portion of said acid separated from the drying zone thereby producing additional concentrated sulfuric acid and a waste gas essentially free of sulfur oxides, cooling the concentrated acid produced in said first and second absorption zones and withdrawing the cooled acid as product.

7. The process of claim 6 in which said gaseous stream containing sulfur dioxide and sulfur trioxide withdrawn from said first conversion zone is passed in indirect heat exchange against the remaining gaseous stream withdrawn from said first absorption zone prior to introduction of said remaining gaseous stream into said second conversion zone.

8. The process of claim 6 in which the concentrated sulfuric acid product of said first and second absorption zones is cooled, a portion of the cooled acid passed to said air drying zone and the remaining cooled acid withdrawn as product.

References Cited
UNITED STATES PATENTS

| | | | |
|---|---|---|---|
| 3,142,536 | 7/1964 | Guth et al. | 23—168 |
| 3,147,074 | 9/1964 | Maurer | 23—168 |

OSCAR R. VERTIZ, *Primary Examiner.*

ARTHUR J. GREIF, *Assistant Examiner.*